UNITED STATES PATENT OFFICE.

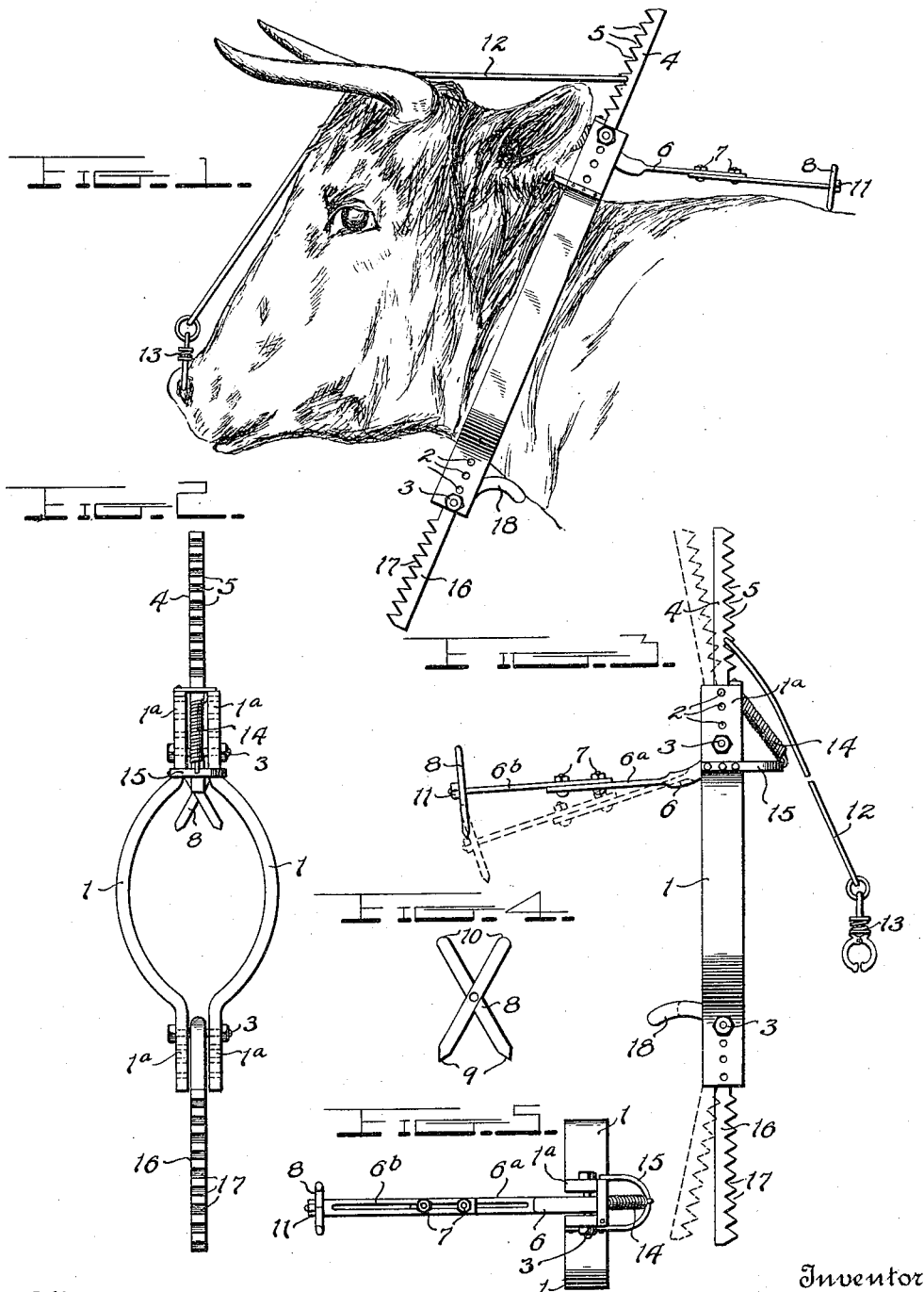

JOHN A. JACOBS AND EARL TWIST, OF HEBRON, NORTH DAKOTA.

ANIMAL-POKE.

1,150,942. Specification of Letters Patent. Patented Aug. 24, 1915.

Application filed June 18, 1914. Serial No. 845,852.

*To all whom it may concern:*

Be it known that we, JOHN A. JACOBS and EARL TWIST, citizens of the United States, residing at Hebron, in the county of Morton and State of North Dakota, have invented certain new and useful Improvements in Animal-Pokes, of which the following is a specification.

The present invention relates to certain new and useful improvements in animal pokes, and has for its object to provide a device of this character which embodies novel features of construction whereby it will operate in an effective manner to prevent the animal from crawling under, breaking through, or jumping over a fence without causing any material discomfort to the animal when reclining or grazing.

A further object of the invention is to provide an animal poke which is comparatively simple and inexpensive in its construction, which can be readily applied to the neck of an animal, and which will prove effective upon vicious and unruly beasts.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a view in side elevation of an animal's head, showing the poke positioned thereon. Fig. 2 is a front elevation of the poke. Fig. 3 is a side elevation of the same, swinging positions of the fence wire engaging levers being indicated by dotted lines. Fig. 4 is an enlarged detail view of the reversible prod member. Fig. 5 is a top plan view of the poke.

Corresponding and like parts are referred to in the following description and indicated in all the views of the drawing by the same reference characters.

Specifically describing the present embodiment of the invention, the numerals 1 designate a pair of arched or bowed side bars which are adapted to be applied to the neck of the animal from opposite sides thereof. The ends of the arched side bars 1 are formed with the extensions 1ª, each of which is provided with a series of openings 2. Pivot bolts 3 connect the corresponding extensions 1ª at the top and bottom of the poke and these pivot bolts may pass through any selected set of the openings 2, as may be found most advantageous in applying the poke to the neck of an animal.

Pivoted upon the upper bolt 3 and projecting upwardly from the side bars 1 is a lever 4, the forward edge of the lever being formed with a series of notches 5 adapted to be engaged by the wires or bars of a fence in the event the animal should attempt to pass through the fence and escape from the inclosure in which it is confined. The lower end of the lever 4 is formed with a rearward extension 6 which is arranged at substantially right angles to the lever. This extension 6 is preferably adjustable in length, being composed of two sections 6ª and 6ᵇ which have a pin and slot connection 7 so that the section 6ᵇ can be moved in and out upon the section 6ª and firmly clamped in an adjusted position.

The extremity of the lateral or rearward extension 6 of the upper lever 4 carries a reversible prod member 8 which is shown in the present instance as substantially cruciform in shape, being constructed with a pair of sharp prongs 9 on one side thereof and a pair of dull prongs 10 on the opposite side thereof. The prod member 8 is pivoted at the intersection of its arms upon the extremity of the extension 6 and is adapted to be locked in an adjusted position by means of a clamping nut 11. With this construction it will be obvious that either the sharp prongs 9 or the dull prongs 10 can be turned downwardly into operative position according to the disposition of the animal to which the poke is applied.

Connected to the upper lever 4 and extending forwardly over the top of the animal's head is a flexible member such as a cord 12, the extremity of the cord being connected to a bull ring 13 which is applied to the nose of the animal. Should the animal attempt to pass through a fence one of the wires or bars thereof would engage the upper lever 4 of the poke and swing the same rearwardly, thereby pulling upon the ring 13 and at the same time swinging downwardly upon the rearward extension 6 of the lever so as to cause one set of prongs of the prod member 8 to prick into or bear against the shoulders of the animal. The combined action of the ring and prod member would cause the animal to desist from its efforts to pass through the fence, and as soon as the lever member 4 was disengaged from the fence wire, the pull upon the ring 13 would be relieved and the pressure upon the prod member 8 released.

In order to hold the upper lever member 4 normally in alinement with the axis of the poke and in an inoperative position, as indicated by Fig. 1, a spring 14 is connected thereto, the said spring being also connected to a U shaped bracket 15 which projects forwardly from the upper ends of the arched side bars 1 and is detachably connected thereto. The tension in this spring is sufficient to normally swing the upper lever 4 forwardly into an inoperative position, although when the lever 4 is engaged by a fence wire the lever 4 will be readily swung rearwardly against the action of the spring.

Projecting downwardly from the lower ends of the arched side bars 1 is a second lever 16 which is pivotally mounted upon the lower pivot bolt 3. The forward edge of the lever 16 is formed with a series of notches 17 corresponding to the notches 5 of the upper lever 4 and adapted to be engaged in a similar manner by a fence wire should the animal attempt to pass through or climb over a fence. The upper end of the lower lever 16 may be formed with a rearwardly extending arm 18 adapted to bear against the neck of the animal and be forced inwardly against the same when the lever is swung rearwardly by engagement with a fence wire.

While the poke has been shown and described as employed in connection with the cord 12 and bull ring 13, it will be obvious that these members may be removed and the device used without them when a bull ring is not deemed necessary.

Having thus described the invention, what we claim as new and desire to secure by Letters Patent, is:—

1. An animal poke including a neck embracing element, a fence wire engaging lever pivotally mounted thereon and formed with a rearward extension, and a reversible prod member pivotally mounted upon the extension and formed with two sets of oppositely extending arms, one set of the arms terminating in sharp prongs while the opposite set of arms terminate in dull prongs and the prod member being adapted to be turned to bring either the sharp prongs or the dull prongs into operative position.

2. An animal poke including a pair of arched side bars adapted to be applied to opposite sides of the animal's neck and formed with upper and lower extensions, a fence wire engaging lever pivotally mounted between the upper extensions and formed with a rearwardly projecting extension, a reversible prod member mounted upon the rearwardly projecting extension, means for locking the reversible prod member in an adjusted position, a spring acting upon the fence wire engaging lever to hold the same yieldably in an inoperative position, a second wire fence engaging lever pivotally mounted between the lower sets of extensions of the side bars, said lever being formed with a rearwardly extending arm adapted to engage the neck of the animal.

In testimony whereof we affix our signatures in presence of two witnesses.

JOHN A. JACOBS.
EARL TWIST.

Witnesses:
  EMIL KRAUTH,
  FRITZ CONRATH.

Copies of this patent may be obtained for five cents each, by addressing the "Commissioner of Patents, Washington, D. C."